(12) United States Patent
Hoyme et al.

(10) Patent No.: US 7,383,087 B2
(45) Date of Patent: Jun. 3, 2008

(54) SYSTEM AND METHOD FOR RECOVERY FROM MEMORY ERRORS IN A MEDICAL DEVICE

(75) Inventors: Kenneth P. Hoyme, Plymouth, MN (US); Aaron Larson, St. Paul, MN (US)

(73) Assignee: Cardiac Pacemakers, Inc., St. Paul, MN (US)

( * ) Notice: Subject to any disclaimer, the term of this patent is extended or adjusted under 35 U.S.C. 154(b) by 22 days.

(21) Appl. No.: 10/806,719

(22) Filed: Mar. 23, 2004

(65) Prior Publication Data

US 2005/0216063 A1 Sep. 29, 2005

(51) Int. Cl.
*A61N 1/08* (2006.01)
(52) U.S. Cl. ...................................... 607/27
(58) Field of Classification Search ............ 607/27, 607/59, 31
See application file for complete search history.

(56) References Cited

U.S. PATENT DOCUMENTS

| | | | |
|---|---|---|---|
| 5,735,882 A | 4/1998 | Rottenberg et al. | |
| 6,128,528 A * | 10/2000 | Ericksen et al. | 607/2 |
| 6,198,968 B1 | 3/2001 | Prutchi et al. | |
| 6,456,875 B1 | 9/2002 | Wilkinson et al. | |
| 6,532,389 B1 * | 3/2003 | Shahandeh | 607/27 |
| 6,584,355 B2 | 6/2003 | Stessman | |
| 6,635,048 B1 * | 10/2003 | Ullestad et al. | 604/890.1 |
| 2002/0032470 A1 * | 3/2002 | Linberg | 607/60 |
| 2003/0036776 A1 * | 2/2003 | Foster et al. | 607/9 |
| 2003/0135244 A1 | 7/2003 | Esler | |
| 2003/0176894 A1 | 9/2003 | Stahmann et al. | |
| 2004/0138724 A1 | 7/2004 | Sieracki et al. | |

FOREIGN PATENT DOCUMENTS

EP 0753327 A2 1/1997

\* cited by examiner

*Primary Examiner*—George R. Evanisko
*Assistant Examiner*—Michael Kahelin
(74) *Attorney, Agent, or Firm*—Schwegman, Lundberg & Woessner, P.A.

(57) ABSTRACT

A system comprising an implantable medical device that comprises at least one electrical input to receive sensed electrical activity of a heart of a patient, a memory, and a controller circuit. The controller circuit is coupled to the electrical input and memory and is operable to enter a memory scrubbing mode that increases a rate of detecting and correcting single bit errors in the memory when the controller circuit determines the implantable device is in a high-energy radiation environment.

43 Claims, 4 Drawing Sheets

SYSTEM AND METHOD FOR RECOVERY FROM MEMORY ERRORS IN A MEDICAL DEVICE

TECHNICAL FIELD

This patent application relates generally to implantable medical devices and, in particular, but not by way of limitation, to a system and method for reducing the susceptibility of the devices to single event upsets.

BACKGROUND

Implantable medical devices (IMDs) are devices designed to be implanted into a patient. Some examples of these devices include cardiac rhythm management devices such as implantable pacemakers and implantable cardioverter defibrillators (ICDs). The devices are used to treat patients using electrical therapy and to aid a physician or caregiver in patient diagnosis through internal monitoring of a patient's condition. The devices may include electrical leads in communication with sense amplifiers to monitor electrical heart activity within a patient, and often include sensors to monitor other internal patient parameters. Other examples of implantable medical devices include implantable insulin pumps or devices implanted to administer drugs to a patient. IMDs often include microcontrollers or microprocessors along with memory to store program instructions and data. Corruption of data in the memory can lead to erroneous operation of an IMD.

SUMMARY

This document discusses, among other things, systems and methods for detecting and correcting memory errors in implantable medical devices when the devices are exposed to high-energy radiation environments. In one system example, the system comprises an implantable medical device that includes at least one electrical input to receive sensed electrical activity of a heart of a patient, a memory, and a controller circuit. The controller circuit is coupled to the electrical input and memory and is operable to enter a memory scrubbing mode that increases a rate of detecting and correcting single bit errors in the memory when the controller circuit determines the implantable device is in a high-energy radiation environment.

Another example includes a method that comprises determining that an implantable medical device is in a high-energy radiation environment, enabling a memory scrubbing mode in response to the implantable medical device entering the high-energy radiation environment, and increasing a rate of detecting and correcting memory errors in the device upon the enabling of the scrubbing mode. Other examples and advantages are also discussed in the following detailed description and represented in the drawings that form a part thereof.

BRIEF DESCRIPTION OF THE DRAWINGS

In the drawings like numerals refer to substantially similar components throughout the several views. Reference numerals with different letter suffixes represent different instances of substantially similar components.

DETAILED DESCRIPTION

In the following detailed description, reference is made to the accompanying drawings which form a part hereof, and specific embodiments in which the invention may be practiced are shown by way of illustration. It is to be understood that other embodiments may be used and structural changes may be made without departing from the scope of the present invention.

The present application discusses, among other things, systems and methods for detecting and correcting memory errors in implantable medical devices (IMDs) when the devices are exposed to high-energy radiation environments.

Cancer is a common co-morbidity among patients who use IMDs. These patients may be exposed to high-energy radiation cancer therapy. As medical technology continues to improve, patients with IMDs will live longer and the likelihood that they could also become cancer patients increases. Exposure to radiation therapy increases the likelihood that the implanted devices will experience memory failures. These memory failures may be in the form of single event upsets that corrupt random access memory (RAM). The memory failures can occur in memory locations containing operating parameters of the IMD or in memory locations containing program instructions. These failures may require explanting an IMD from the cancer patient. Manufacturers of IMDs typically label the devices to warn a physician or technician to shield the device during the radiation therapy. However, device failure from memory corruption may still occur from exposing the IMD to back-scattered particles during the radiation therapy.

Figure 1:
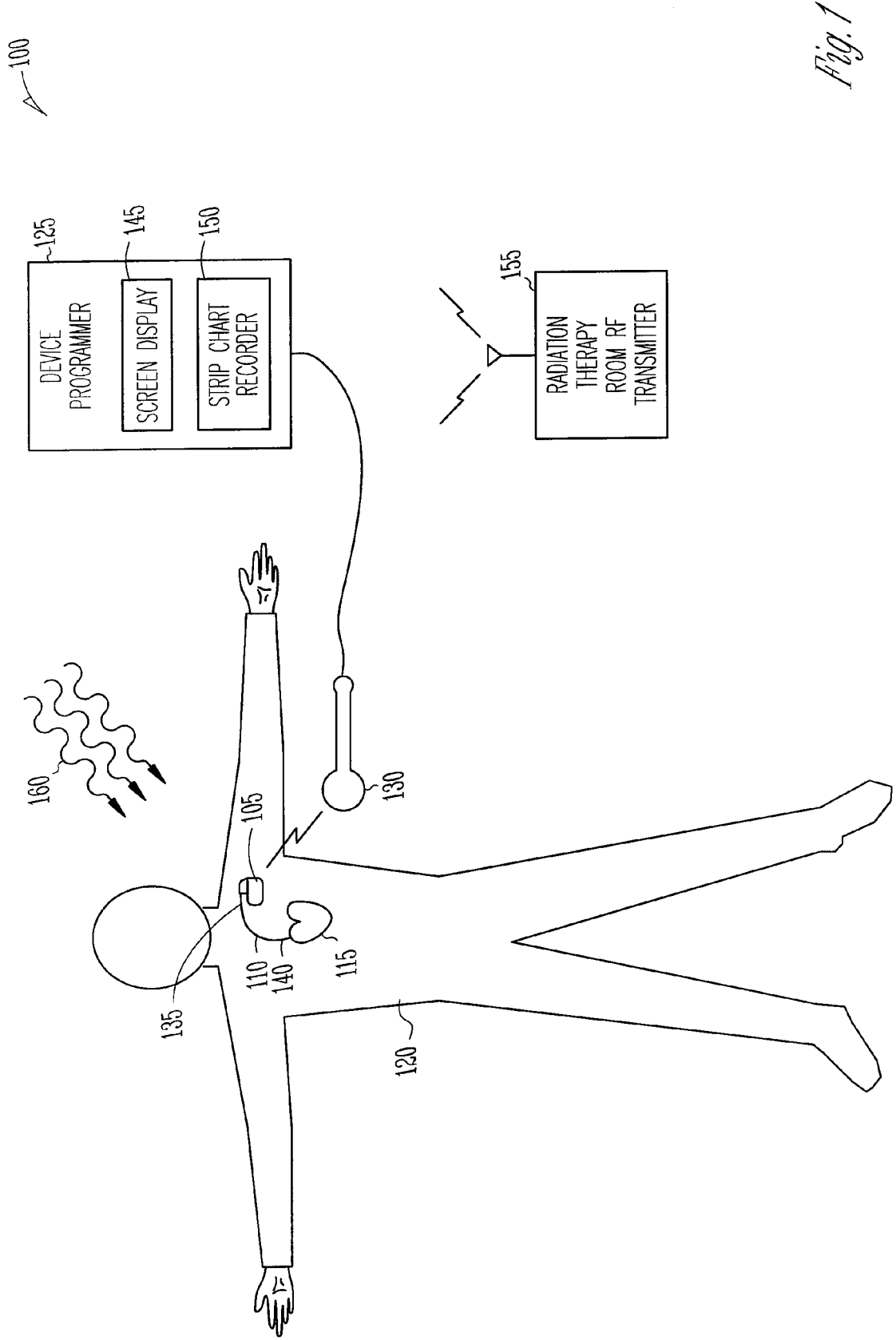
FIG. 1 illustrates an embodiment of a system that uses an implantable medical device.

FIG. 1 illustrates an embodiment of a system 100 that uses an implantable medical device (IMD) 105. The system 100 shown is one embodiment of portions of a system 100 used to treat a cardiac arrhythmia. A pulse generator (PG) or other IMD 105 is coupled by a cardiac lead 110, or additional leads, to a heart 115 of a patient 120.

Examples of IMD 105 include, without limitation, a pacer, a defibrillator, a cardiac resynchronization therapy (CRT) device, or a combination of such devices. This document relates to any IMD that can transmit data while implanted in a human or animal patient 120 and is not limited only to devices that deliver electrical therapy through leads. This also includes IMDs that are purely diagnostic in nature such as devices implanted to communicate diagnostic data to an external device. This further relates to IMDs that deliver a drug therapy to a patient.

Cardiac lead 110 includes a proximal end 135 that is coupled to IMD 105 and a distal end 140, coupled to one or more portions of a heart 115. System 100 also includes an IMD programmer or other external device 125 that provides wireless communication with the IMD 105, such as by using a telemetry device 130. One embodiment of wireless communication by telemetry is communication using radio frequency (RF) signals. Another embodiment is communication using infrared light signals. Yet another embodiment is communication using coils electrically coupled with mutual inductance. In one example of an external device 125, the external device 125 is able to communicate one or more operational parameters to the implantable device 105 in order to program the IMD 105. If the IMD patient 120 is also a cancer patient, the patient 120 as well as the IMD 105 may be exposed to high-energy radiation therapy 160 as part of cancer treatment.

Figure 2:
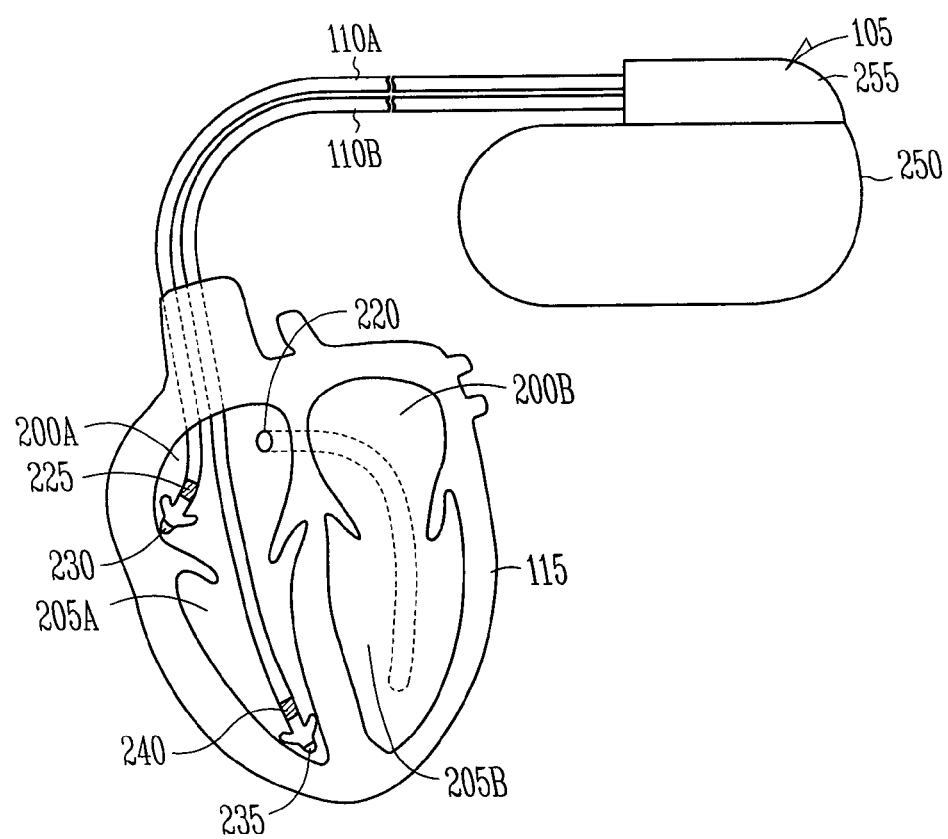
FIG. 2 illustrates an implantable medical device coupled by one or more leads to heart.

FIG. 2 illustrates an IMD 105 coupled by one or more leads 110A-B to heart 115. Heart 115 includes a right atrium 200A, a left atrium 200B, a right ventricle 205A, a left ventricle 205B, and a coronary sinus 220 extending from right atrium 200A. In this embodiment, atrial lead 110A includes electrodes (electrical contacts, such as ring electrode 225 and tip electrode 230) disposed in, around, or near an atrium 200 of heart 115 for sensing signals and/or delivering pacing therapy to the atrium 200. Lead 110A optionally also includes additional electrodes, such as for delivering atrial and/or ventricular cardioversion/defibrillation and/or pacing or resynchronization therapy to heart 115.

Ventricular lead 110B includes one or more electrodes, such as tip electrode 235 and ring electrode 240, for delivering sensing signals and/or delivering pacing therapy. Lead 10B optionally also includes additional electrodes, such as for delivering atrial and/or ventricular cardioversion/defibrillation and/or pacing therapy to heart 115. IMD 105 includes components that are enclosed in a hermetically-sealed housing or "can" 250. Additional electrodes may be located on the can 250, or on an insulating header 255, or on other portions of IMD 105, for providing unipolar pacing and/or defibrillation energy in conjunction with the electrodes disposed on or around heart 115. Other forms of electrodes include meshes and patches which may be applied to portions of heart 115 or which may be implanted in other areas of the body to help "steer" electrical currents produced by IMD 105. In one embodiment, one of atrial lead 110A or ventricular lead 110B is omitted, i.e., a "single chamber" device is provided, rather than the dual chamber device illustrated in FIG. 2. In another embodiment, additional leads are provided for coupling the IMD 105 to other heart chambers and/or other locations in the same heart chamber as one or more of leads 110A-B. The present methods and systems will work in a variety of configurations and with a variety of electrical contacts or "electrodes."

Figure 3:
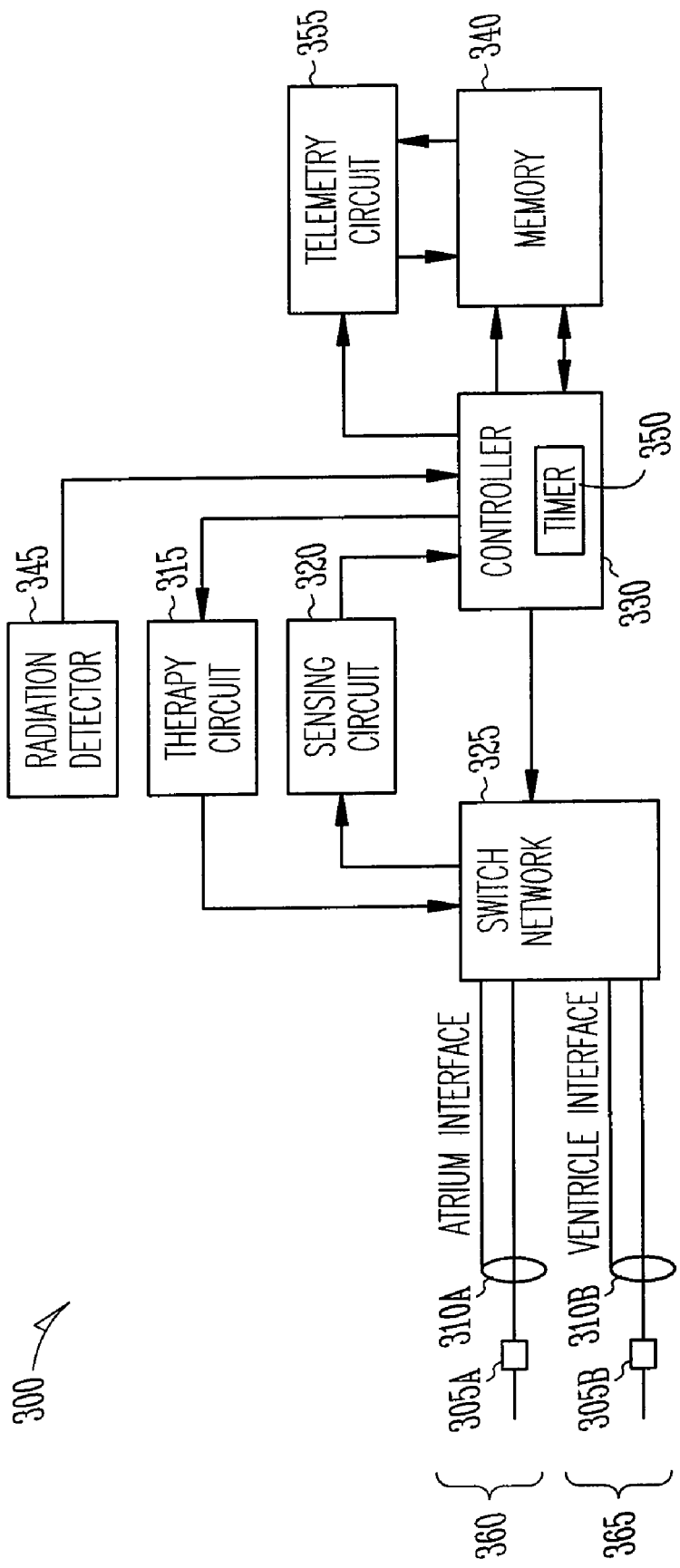
FIG. 3 shows an exemplary embodiment of an implantable medical device that is coupled to one or more leads.

FIG. 3 shows an exemplary embodiment of an IMD 300 that is coupled to one or more leads, such as bipolar leads 360, 365. The bipolar leads 360, 365 include tip electrodes 305A, 305B and ring electrodes 310A, 310B. The IMD 300 includes a therapy circuit 315 to deliver electrical therapy to heart 115 through the leads 360, 365 and electrodes and a sensing circuit 320 to sense electrical signals on the leads 360, 365 and electrodes. To sense the electrical signals, the sensing circuit 320 includes sense amplifier circuits coupled to the switch network 325. The switch network 325 is also operable to couple the sensing circuit 320 to any combination of one or more electrodes. The switching network 325 further couples the therapy circuit 315 to the electrodes.

Typically, the IMD 300 delivers therapy through the leads or senses voltages on the leads, such as between the tip electrodes 305A, 305B and ring electrodes 310A, 310B. The IMD 300 includes a controller circuit 330 that is operable to connect the therapy circuit 315 and/or sensing circuit 320 to the electrodes through the switch network 325. In one embodiment, the controller circuit 330 is operable through logic circuits implementing a state-machine in hardware. In another embodiment, controller circuit 330 includes a processor executing instructions contained in firmware. In yet another embodiment, the controller circuit 330 includes a processor executing software instructions. In yet another embodiment, the controller circuit 330 includes any combination of hardware, software and/or firmware.

The IMD 300 also includes a memory circuit 340 coupled to the controller circuit 330. In one embodiment, the memory circuit 340 includes data storage for storing operating parameters of the IMD 300. In another embodiment, the memory 340 includes firmware or volatile memory such as random access memory (RAM) containing instructions executable by the controller circuit 330. In another embodiment, the memory circuit 340 includes hardware registers accessible by the controller circuit 330. If the IMD patient is also a cancer patient, exposure to high-energy radiation therapy increases the likelihood that the IMD 300 will experience memory failures due to single event upsets (SEUs). An SEU is a problem that occurs when high density electronics are subjected to radiation fields. For example, an alpha particle impinging on a semiconductor substrate of the memory 340 may generate electron-hole pairs that corrupt data stored as a charge on a capacitive element. The memory location corrupted may contain an operating parameter or an executable instruction. This could lead to device failure, possibly requiring explanting the IMD 300 from a patient.

To mitigate memory failures in the IMD 300, the controller circuit 330 is operable to enter a "memory scrubbing" mode where the controller circuit 330 detects and corrects memory errors. In normal operation, the controller circuit 330 checks for memory errors in the memory locations it accesses. When in memory scrubbing mode, the controller circuit 330 systematically checks locations in memory 340 for memory errors; even those memory locations not accessed in normal operation. Systematically checking refers to any systematic or uniform method of ensuring that all memory locations are checked, such as, for example, by incrementing an address. In one embodiment, the controller circuit 330 also systematically checks memory 340 for errors once-per-day when not in the memory scrubbing mode. This is done to correct rare errors that may occur due to normal background radiation levels. However, when the controller circuit 330 enters the memory scrubbing mode, the controller circuit 330 increases a rate of checking for errors. In one embodiment, the controller circuit 330 checks all memory at a rate of once-per-second while in memory scrubbing mode. In another embodiment, the controller circuit 330 periodically checks portions of memory.

To detect memory errors in scrubbing mode, the controller circuit 330 reads memory 340 and checks the parity of the memory contents. In one embodiment, the controller circuit 330 reads the memory locations and compares the parity of the contents to stored parity bits. In one example of this embodiment, parity bits are stored for each word of memory. In another example, the parity bits are calculated and stored for an array or matrix of memory words. In another embodiment, the controller circuit 330 uses the results of the parity check to detect and correct single bit errors (SBEs). This detection and correction uses a Modified Hamming Code, for example. In another embodiment, the controller circuit 330 also detects multiple bit errors (MBEs) and flags the occurrence of an MBE. In another embodiment, the controller detects and corrects MBEs. This detection and correction uses Reed-Solomon codes, for example.

The amount of additional circuitry required for an IMD to detect and correct errors varies with the extent of detecting and checking done in memory scrubbing mode. In general, detecting and correcting SBEs is less expensive in terms of size, complexity and power than detecting and correcting MBEs. Because IMDs are usually battery-powered and designed to be of small size, in one example, the IMD only detects and corrects SBEs.

A memory read operation is used to detect an error and a memory write operation is used to correct an error. Much of the memory 340 of an IMD 300 may be write protected to prevent erroneous code executed by the controller circuit 330 or external device 125 from corrupting certain critical operating parameters in the IMD 300. Such critical operating parameters are stored in the write-protected region of the memory 340. However, in memory scrubbing mode the controller circuit 330 has read and write access to even the most critical locations of memory to correct errors. Error detecting and error correcting operations impact the longevity of a battery-powered IMD 300. Occasionally executing this function balances power consumption against the likelihood of errors accumulating in memory 340. When the IMD 300 is in a high-energy radiation environment, however, the likelihood of errors greatly increases and the need for memory scrubbing increases.

In one embodiment, once the controller circuit 330 enters the memory scrubbing mode, the memory scrubbing is executed continuously in controller circuit 330 and the memory scrubbing function is given higher priority than other IMD 300 functions, including those that provide therapy. This embodiment may be useful if the therapy functions are contained in RAM. In another embodiment, therapy functions are given higher priority in the controller circuit 330 than the memory scrubbing function. In an example of this embodiment, instructions contained in firmware that provide therapy are given the highest priority for execution in the controller circuit 330, and instructions to execute the memory scrubbing function use the remaining capacity of controller circuit 330. In yet another embodiment, a percentage of the capacity of the controller circuit 330 is allocated for memory scrubbing. This percentage of executing capacity is determined by designers of IMDs to balance the likelihood of errors against the amount of battery-power, and thus battery life, consumed by executing the memory scrubbing function. In yet another embodiment, this percentage of controller circuit 330 capacity allocated for memory scrubbing is programmed into the IMD using the external device.

In yet another embodiment, the percentage of capacity used for memory scrubbing is gradually reduced over time when the controller circuit 330 determines that the IMD 300 is no longer in a high-energy radiation environment. In this embodiment, the percentage is gradually decreased until the percentage capacity reaches the capacity used for error detection for normal background radiation energy levels.

To initiate memory scrubbing mode, the controller circuit 330 determines that the IMD 300 is in a high-energy radiation environment. In one embodiment, the controller circuit 330 determines that the IMD 300 is in a high-energy radiation environment by monitoring the number of errors encountered while accessing memory locations in normal operation mode. The controller circuit 330 compares the rate of memory errors to a predetermined threshold rate and enters memory scrubbing mode when the detected rate exceeds the threshold rate. The threshold rate is determined from characteristics of the device that include, among other things, the type of memory in the device and the shielding of the device. In an example of this embodiment, the threshold rate is pre-programmed into the IMD 300.

In another embodiment of determining that the IMD 300 is in a high-energy radiation environment, the controller circuit 330 is coupled to a radiation detector sensor 345 and monitors the output of the sensor 345. In an example of this embodiment, the sensor 345 outputs an electrical signal to the controller circuit 330 when a radiation level exceeds a threshold level. In another example, the sensor 345 is implemented as a radiation-detecting memory cell, or cells, designed to be more susceptible to radiation than other cells in memory 340. The controller circuit 330 then monitors such radiation-detecting memory cell or cells for an increase in a rate of memory errors in those cells to determine that the IMD 300 is in a high-energy radiation environment. In one example, the controller circuit 300 determines the IMD 300 is in a high-energy radiation environment by detecting errors in the radiation-detecting memory cells at a rate of one error per minute. In another example, the controller circuit 300 determines the IMD 300 is in a high-energy radiation environment when a predetermined number of the cells contain errors. Such radiation-detecting memory cells may be scattered or distributed throughout various physical locations in memory 340. Another example is to scatter these radiation-detecting cells as clusters of the cells throughout various physical locations in memory 340.

In another embodiment, the controller circuit 300 activates the radiation detector sensor 345 only periodically, effectively placing the sensor in an "arm" mode. This embodiment is useful in a battery-powered device to conserve battery energy used to activate the sensor 345. In one example, the controller circuit 300 is programmable to arm the sensor 345 for the duration of high-energy radiation therapy. In another example, the controller circuit 300 is programmable to arm the sensor 345 for a duration sufficient to cover multiple therapies such as durations of days or weeks.

To exit memory scrubbing mode, the controller circuit 330 determines that the IMD 300 is no longer in a high-energy radiation environment. In one embodiment, the controller circuit 330 detects that the IMD 300 is no longer in a high-energy radiation environment when the rate of memory errors falls below a predetermined threshold rate. In an example of this embodiment, the error rate is determined by monitoring a count of memory errors detected during systematic memory reads of the memory 340. This count of memory errors may be determined from only a portion of the memory being systematically read while in scrubbing mode. The exit threshold rate may be different from the initiation threshold rate. For example, the initiation rate may be one error every thirty seconds, while the exit rate may be one error every minute. This permits hysteresis in the process of initiating and exiting memory scrubbing mode.

In another embodiment, the controller circuit 330 is coupled to the radiation detector sensor 345 and the controller circuit 330 exits scrubbing mode when the sensor 345 indicates a radiation level drops below a threshold level. In yet another embodiment, the radiation sensor 345 includes a memory cell, or cells, designed to be more susceptible to radiation than other radiation cells in memory and the controller circuit 330 exits scrubbing mode when the controller circuit 330 detects that a rate of errors in the memory cell or cells has dropped below a predetermined threshold rate. Again, the predetermined exit error rate may be different from the initiation error rate to provide hysteresis to the transitioning process.

In yet another embodiment of exiting memory scrubbing mode, the controller circuit 330 is coupled to a timer circuit 350 and the controller circuit 330 is operable to exit the memory scrubbing mode after being in the memory scrubbing mode for a predetermined time duration. This time duration is set to a value longer than the time needed to deliver the high-energy radiation therapy. Examples of such a time duration include durations of minutes or hours.

In yet another embodiment of exiting memory scrubbing mode, once the controller circuit 330 determines that the device is no longer in a high-energy radiation environment, the controller circuit 330 makes a substantially immediate return to the normal radiation-level environment rate of detecting and correcting errors. In another embodiment, the controller circuit 330 gradually reduces the rate of memory scrubbing until the controller circuit 330 returns to the normal radiation-level environment rate.

The controller circuit 330 is coupled to a telemetry circuit 355. The telemetry circuit 355 communicates with an external device 125 in FIG. 1. The external device is able to communicate one or more operational parameters to the IMD 300. The parameters are then written into memory 340 to program the IMD 300. The memory 340 includes RAM and/or hardware registers. One example of setting a predetermined time duration to be in memory scrubbing mode is to program the time duration into the IMD 300 using the external device 125. The controller circuit 330 then uses the timer circuit 350 to determine when the duration is met or exceeded to exit the memory scrubbing mode.

In another embodiment of determining that the IMD 300 is in a high-energy radiation environment, the external device 125 communicates with the telemetry circuit 355 to enable a high-energy radiation memory scrubbing mode in the implantable medical device IMD 300. For example, a care giver would use the external device 125 to enable memory scrubbing mode in the IMD 300 before beginning high-energy radiation therapy. To exit the memory scrubbing mode, the external device 125 is used to disable the scrubbing mode in the IMD 300.

If the IMD patient is also a cancer patient, another embodiment of the external device 125 of FIG. 1 includes an RF transmitter 155 associated with a radiation therapy device. Such an RF transmitter 155 transmits an RF indication in the treatment room that causes IMDs or other devices to transition to a memory scrubbing mode. In one embodiment, the RF transmitter 155 communicates with the telemetry circuit 355 in FIG. 3 before radiation therapy to enable the memory scrubbing mode. In another embodiment, the RF transmitter 155 transmits continuously during the radiation therapy, and the IMDs or other devices in the treatment room remain in memory scrubbing mode while the RF transmitter is transmitting. In another embodiment of the external device 125, the external device 125 is operable to communicate with a global computer network.

Figure 4A:
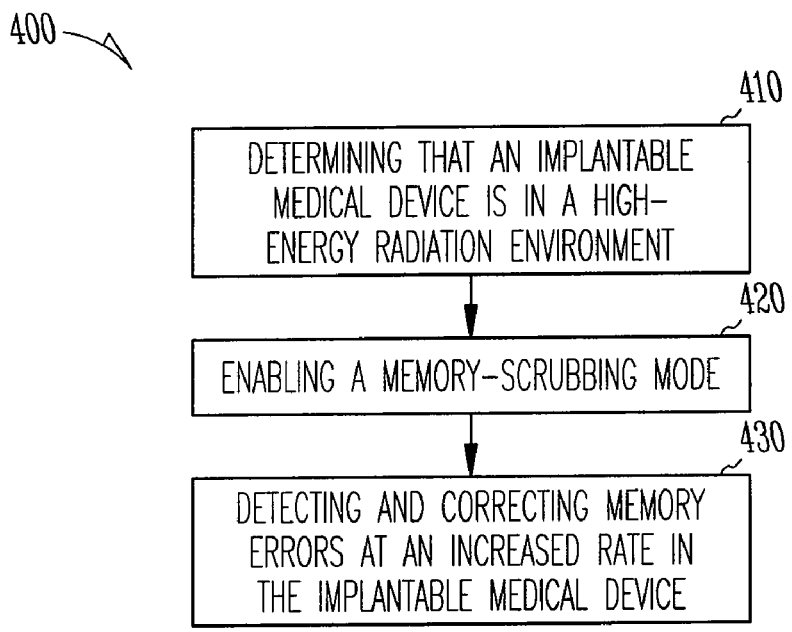
FIGS. 4A and 4B are block diagrams illustrating a method 400 for detecting and correcting memory errors in an implantable medical device.

FIG. 4A is a block diagram illustrating a method 400 of detecting and correcting memory errors in an IMD 300. At 410, an IMD 300 determines it is in a high-energy radiation environment. For example, a high-energy radiation environment is determined when the IMD 300 detects a number of errors that exceeds a threshold while the IMD 300 is in normal operation. In another example, the IMD 300 includes a radiation-detector sensor 345 and the sensor 345 provides an indication that the IMD 300 is in a high-energy radiation environment. In yet another example, the IMD 300 detects a number or rate of memory errors that occur in a radiation-detecting memory cell or cells. In yet another example, the IMD 300 determines it is in a high-energy radiation environment by communication with an external device 125. At 420, a memory scrubbing mode is enabled in response to the implantable medical device entering the high-energy radiation environment. At 430, a rate of detecting and correcting memory errors is increased in the IMD 300 upon the enabling of the scrubbing mode.

Figure 4B:
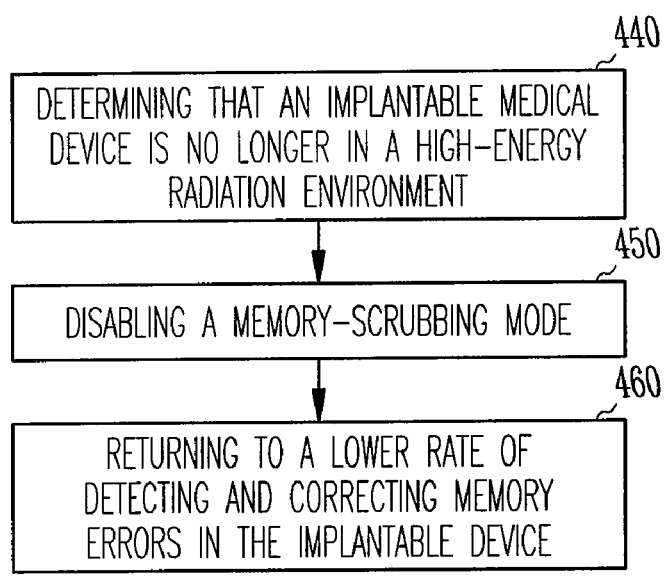

FIG. 4B shows a further embodiment of the method 400. At 440, the IMD 300 determines it is no longer in the high-energy radiation environment. For example, the IMD determines it is no longer in a high-energy radiation environment when the IMD 300 detects a number of errors that is below a threshold number while the device is in a memory scrubbing mode. In another example, the IMD 300 includes a radiation-detector sensor 345 and the sensor 345 provides an indication that the IMD 300 is no longer in a high-energy radiation environment. In yet another example, the IMD 300 detects that a number or rate of memory errors that occur in a radiation-detecting memory cell or cells is below a threshold number or rate. In yet another example, the IMD 300 determines it is no longer in a high-energy radiation environment by communication with an external device 125. In yet another example, the IMD 300 determines it is no longer in a high-energy radiation environment by expiration of a timed duration. At 450, the memory scrubbing mode is disabled. At 460, the IMD 300 returns to a lower rate of detecting and correcting memory errors in the device.

The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations, or variations, or combinations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A system comprising:
   an implantable medical device comprising:
      a memory; and a controller circuit, coupled to the memory, wherein the controller circuit is operable to enter a memory scrubbing mode when the controller circuit determines the implantable device is in a high-energy radiation environment by:
  monitoring a number of errors encountered while accessing memory locations in a normal operation mode, the monitoring including error checking all memory locations of the memory using a first rate of error checking per time period during the normal operation mode;
  using the monitored number of errors to determine a rate of memory errors per time period;
  comparing the rate of memory errors per time period to a programmable threshold rate of memory errors per time period; and
  when the rate of memory errors per time period exceeds the programmable threshold error rate of memory errors per time period, then entering the memory scrubbing mode; and
wherein the memory scrubbing mode has an increased rate of error checking all memory locations of the memory per time period to detect and correct single bit errors in the memory.

2. The system of claim 1, wherein the implantable medical device further includes a sensor coupled to the controller circuit to determine the implantable device has entered a high-energy radiation environment.

3. The system of claim 2, wherein the memory includes a plurality of memory cells, wherein the sensor includes at least one memory cell designed to be more susceptible to radiation energy than other memory cells, and wherein the controller circuit determines a high-energy radiation environment by detecting a rate of memory errors in the memory cell that exceeds a predetermined threshold.

4. The system of claim 3, wherein the at least one memory cell designed to be more susceptible to radiation than other memory cells includes a RAM cell.

5. The system of claim 1, wherein the controller circuit is operable to exit the memory scrubbing mode when the controller circuit determines that the implantable device is no longer in a high-energy radiation environment.

6. The system of claim 5, wherein the controller circuit determines that the implantable medical device is no longer in a high-energy radiation environment by detecting a rate of memory errors that is below a predetermined threshold rate.

7. The system of claim 5, wherein the memory includes a plurality of memory cells, including at least one memory cell designed to be more susceptible to radiation energy than other memory cells, and wherein the controller circuit determines the implantable medical device is no longer in a high-energy radiation environment by detecting a rate of memory errors in the at least one memory cell that is below a predetermined threshold rate.

8. The system of claim 7, wherein the at least one memory cell includes a plurality of memory cells designed to be more susceptible to radiation than other memory cells, and wherein such cells are distributed among a plurality of physical locations of the memory.

9. The system of claim 1, wherein the implantable medical device includes a timer coupled to the controller circuit, and wherein the controller circuit is operable to exit the memory scrubbing mode after a predetermined time duration.

10. The system of claim 1, wherein the controller circuit is operable to detect and correct single bit errors in the memory.

11. The system of claim 1, wherein the controller circuit is operable to detect and correct multiple bit errors in the memory.

12. The system of claim 1, wherein the implantable medical device further includes a telemetry circuit coupled to the controller circuit, wherein the system further includes an external device to communicate with the device through the telemetry circuit, and wherein the controller circuit determines a high-energy radiation environment by the external device enabling a high-energy radiation memory scrubbing mode in the implantable medical device.

13. The system of claim 12, wherein the controller circuit determines that the implantable medical device is no longer in a high-energy radiation environment by the external device disabling the high-energy radiation memory scrubbing mode in the implantable medical device.

14. The system of claim 12, wherein the external device is operable to communicate with a global computer network.

15. The system of claim 12, wherein the external device includes a programmer of an implantable medical device.

16. The system of claim 12, wherein the external device is an RF transmitter associated with a radiation source.

17. The system of claim 1, wherein the implantable medical device further includes:
  at least one output to provide therapy to the patient; and
  a therapy circuit coupled to the at least one output and the controller circuit, the therapy circuit operable to deliver therapy to the patient.

18. The system of claim 17, wherein the controller circuit is operable to execute instructions implementing the memory scrubbing mode at a lower priority than instructions related to therapy.

19. The system of claim 17, wherein the controller circuit is configured to withhold therapy when the implantable medical device enters the memory scrubbing mode.

20. The system of claim 17, wherein the implantable medical device further includes at least one electrical input to receive sensed electrical activity of a heart of a patient, wherein the output includes an electrical output, and the implantable device is a cardiac rhythm management device.

21. The system of claim 20, wherein the implantable medical device includes a cardioverter defibrillator.

22. The system of claim 18, wherein the implantable medical device provides drug therapy to the patient.

23. The system of claim 1, comprising a radiation detector circuit, operatively coupled to the controller circuit, the radiation detector circuit operative to detect a condition correlative to a high energy radiation level to permit the controller to determine whether the implantable device is in a high-energy radiation environment.

24. The system of claim 1, in which the controller circuit is operative to detect, at a checking rate, a rate of occurrence of errors in information stored in the memory circuit, and to compare the rate of occurrence of errors to a predetermined threshold, and to enter the memory scrubbing mode to increase the checking rate from a first checking rate value to a second checking rate value in response to the rate of occurrence of the errors exceeding the predetermined threshold.

25. The system of claim 1, comprising means for determining a condition correlative to a high-energy radiation level that exceeds a background radiation level to declare whether the implantable device is in the high-energy radiation environment.

26. The system of claim 1, comprising:
  a sensing circuit coupled to the electrical input to receive sensed electrical activity of a heart of a patient;

at least one electrical output to provide therapy to the heart;

a therapy circuit coupled to the at least one output, operable to deliver therapy to the heart; and wherein the controller circuit is operable to provide therapy through the therapy circuit.

27. A method comprising:

determining that an implantable medical device is in a high-energy radiation environment by:

monitoring a number of errors encountered while accessing memory locations in a normal operation mode, the monitoring including error checking all memory locations of the memory at a first rate of error checking per time period during the normal operation mode;

using the monitored number of errors to determine a rate of memory errors per time period;

comparing the rate of memory errors per time period to a programmable threshold rate of memory errors per time period; and when the rate of memory errors per time period exceeds the programmable threshold error rate, then entering a memory scrubbing mode; and during the memory scrubbing mode, increasing a rate of error checking of all memory locations of the memory per time period to detect and correct memory errors in the device.

28. The method of claim 27, wherein determining that an implantable medical device is in a high-energy radiation environment includes the implantable device detecting that at least one memory cell susceptible to lower levels of radiation energy than other memory cells has a rate of memory errors that exceeds a predetermined threshold rate.

29. The method of claim 27, wherein determining that an implantable medical device is in a high-energy radiation environment includes an external device enabling the implantable device into a high-energy radiation memory scrubbing mode.

30. The method of claim 27, wherein the method further includes disabling the memory scrubbing mode when a duration of the memory scrubbing mode in the implantable medical device exceeds a predetermined duration.

31. The method of claim 27, wherein the method further includes:

determining that the implantable medical device is no longer in the high-energy radiation environment;

disabling the memory scrubbing mode; and returning to a lower rate of detecting and correcting memory errors in the device.

32. The method of claim 31, wherein determining that the implantable medical device is no longer in a high-energy radiation environment includes the implantable device detecting a rate of memory errors that is below a predetermined threshold.

33. The method of claim 31, wherein determining that the implantable device is no longer in a high-energy radiation environment includes detecting that at least one memory cell susceptible to lower levels of radiation energy than other memory cells has a rate of memory errors below a predetermined threshold rate.

34. The method of claim 31, wherein determining that the implantable device is no longer in a high-energy radiation environment includes an external device disabling the memory scrubbing mode.

35. The method of claim 27, in which the determining that the implantable medical device is in a high-energy radiation environment comprises determining whether condition correlative to a high-energy radiation level exceeds a background radiation level.

36. A system comprising:

an implantable medical device comprising:

a memory; and a controller circuit, coupled to the memory, wherein the controller circuit is operable to enter a memory scrubbing mode when the controller circuit determines the implantable device is in a high-energy radiation environment by:

monitoring a number of errors encountered while accessing memory locations in a normal operation mode;

using the monitored number of errors to determine a rate of memory errors per time period;

comparing the rate of memory errors to a programmable threshold rate of memory errors per time period; and detecting that the rate of memory errors exceeds the programmable threshold error rate;

wherein the memory scrubbing mode has an increased rate of error checking to detect and correct single bit errors in the memory;

a sensor coupled to the controller circuit to determine the implantable device has entered a high-energy radiation environment; and wherein the memory includes a plurality of memory cells, wherein the sensor includes at least one memory cell designed to be more susceptible to radiation energy than other memory cells, and wherein the controller circuit determines a high-energy radiation environment by detecting a rate of memory errors in the memory cell that exceeds a predetermined threshold.

37. The system of claim 36, wherein the at least one memory cell designed to be more susceptible to radiation than other memory cells includes a RAM cell.

38. The system of claim 36, wherein the controller circuit is operable to exit the memory scrubbing mode when the controller circuit determines that the implantable device is no longer in a high-energy radiation environment, and wherein the memory includes a plurality of memory cells, including at least one memory cell designed to be more susceptible to radiation energy than other memory cells, and wherein the controller circuit determines the implantable medical device is no longer in a high-energy radiation environment by detecting a rate of memory errors in the at least one memory cell that is below a predetermined threshold rate.

39. The system of claim 36, wherein the at least one memory cell includes a plurality of memory cells designed to be more susceptible to radiation than other memory cells, and wherein such cells are distributed among a plurality of physical locations of the memory.

40. A method comprising:

determining that an implantable medical device is in a high-energy radiation environment by:

monitoring a number of errors encountered while accessing memory locations in a normal operation mode;

using the monitored number of errors to determine a rate of memory errors per time period;

comparing the rate of memory errors to a programmable threshold rate of memory errors per time period; and detecting that the rate of memory errors exceeds the programmable threshold error rate;

determining that an implantable medical device is in a high-energy radiation environment by using the implantable medical device for detecting that at least one memory cell susceptible to lower levels of radiation energy than other memory cells has a rate of memory errors that exceeds a predetermined threshold rate;

enabling a memory scrubbing mode in response to the implantable medical device entering the high-energy radiation environment; and increasing a rate of error checking to detect and correct memory errors in the device upon the enabling of the scrubbing mode.

41. The method of claim 40, wherein the method further includes:

determining that the implantable medical device is no longer in the high-energy radiation environment;

disabling the memory scrubbing mode; and p1 returning to a lower rate of detecting and correcting memory errors in the device.

42. The method of claim 41, wherein determining that the implantable device is no longer in a high-energy radiation environment includes detecting that at least one memory cell susceptible to lower levels of radiation energy than other memory cells has a rate of memory errors below a predetermined threshold rate.

43. An apparatus comprising:

means for determining that an implantable medical device is in a high-energy radiation environment;

means for:
- monitoring a number of errors encountered while accessing memory locations in a normal operation mode, the monitoring including error checking all memory locations of the memory at a first rate of error checking per time period during the normal operation mode;
- using the monitored number of errors per time period to determine a rate of memory errors per time period;
- comparing the rate of memory errors per time period to a programmable threshold rate of memory errors per time period; and
- detecting that the rate of memory errors per time period exceeds the programmable threshold error rate per time period;

means for enabling a memory scrubbing mode in response to the implantable medical device entering the high-energy radiation environment as determined by the rate of memory errors per time period exceeds the programmable threshold error rate per time period; and means for increasing a rate of error checking of all memory locations of the memory per time period during the memory scrubbing mode to detect and correct memory errors in the device upon the enabling of the scrubbing mode.

* * * * *

UNITED STATES PATENT AND TRADEMARK OFFICE
CERTIFICATE OF CORRECTION

| | | |
|---|---|---|
| PATENT NO. | : 7,383,087 B2 | Page 1 of 1 |
| APPLICATION NO. | : 10/806719 | |
| DATED | : June 3, 2008 | |
| INVENTOR(S) | : Hoyme et al. | |

It is certified that error appears in the above-identified patent and that said Letters Patent is hereby corrected as shown below:

In column 13, line 22, in Claim 41, after "and" delete "p1".

Signed and Sealed this

Second Day of September, 2008

JON W. DUDAS
*Director of the United States Patent and Trademark Office*